United States Patent [19]

Hays

[11] Patent Number: 5,525,034

[45] Date of Patent: Jun. 11, 1996

[54] HYBRID TWO-PHASE TURBINE

[75] Inventor: Lance G. Hays, La Crescenta, Calif.

[73] Assignee: Biphase Energy Company, Placentia, Calif.

[21] Appl. No.: 378,733

[22] Filed: Jan. 26, 1995

Related U.S. Application Data

[63] Continuation-in-part of Ser. No. 878,605, May 5, 1992, Pat. No. 5,385,446.

[51] Int. Cl.$^6$ .................................. F01K 25/04
[52] U.S. Cl. ...................... 415/80; 415/88; 415/202
[58] Field of Search .................... 415/80, 88, 143, 415/151, 199.6, 202; 60/649

[56] References Cited

U.S. PATENT DOCUMENTS

| | | | |
|---|---|---|---|
| 2,531,896 | 11/1950 | Telbizoff | 415/202 |
| 3,093,080 | 6/1963 | Tarifa et al. | 415/143 |
| 3,358,451 | 12/1967 | Feldman et al. | 60/649 |
| 3,749,513 | 7/1973 | Chute | 415/199.6 |
| 3,838,668 | 10/1974 | Hays et al. . | |
| 3,879,949 | 4/1975 | Hays et al. . | |
| 3,936,214 | 2/1976 | Zupanick | 415/88 |
| 3,972,195 | 8/1976 | Hays et al. . | |
| 4,087,261 | 5/1978 | Hays . | |
| 4,141,219 | 2/1979 | Elliot | 60/649 |
| 4,227,373 | 10/1980 | Amend et al. . | |
| 4,258,551 | 3/1981 | Ritzi . | |
| 4,267,964 | 5/1981 | Williams | 415/88 |
| 4,298,311 | 11/1981 | Ritzi . | |
| 4,336,693 | 6/1982 | Hays et al. . | |
| 4,339,923 | 7/1982 | Hays et al. . | |
| 4,391,102 | 7/1983 | Studhalter et al. . | |
| 4,441,322 | 4/1984 | Ritzi | 60/649 |
| 4,511,309 | 4/1985 | Maddox | 415/202 |
| 5,385,446 | 1/1995 | Hays | 415/80 |

Primary Examiner—Edward K. Look
Assistant Examiner—James A. Larson
Attorney, Agent, or Firm—William W. Haefliger

[57] ABSTRACT

In a rotary turbine having inlets for mixtures of gas and liquid, and a rotary shaft, the combination comprising a separator to receive the mixture of gas and liquid, and to separate the mixture into a stream of gas and a stream of liquid; first structure to receive the stream of gas for generating torque exerted on the shaft; the separator including a rotating surface to receive the stream of liquid to form a liquid layer, and for generating torque exerted on the shaft; there being generally radial outflow passages for the separated liquid stream, and liquid nozzles terminating liquid outflow passages to pass the liquid stream and to convert the induced pressures of the radial outflow of the liquid to velocity of liquid jets, and to convert the reaction forces of the liquid jets to shaft power. Gas nozzles may be provided to receive the separated gas stream which is centrifugally pressurized and expanded through the gas nozzles to produce gas jets directed to produce torque acting on the shaft.

8 Claims, 15 Drawing Sheets

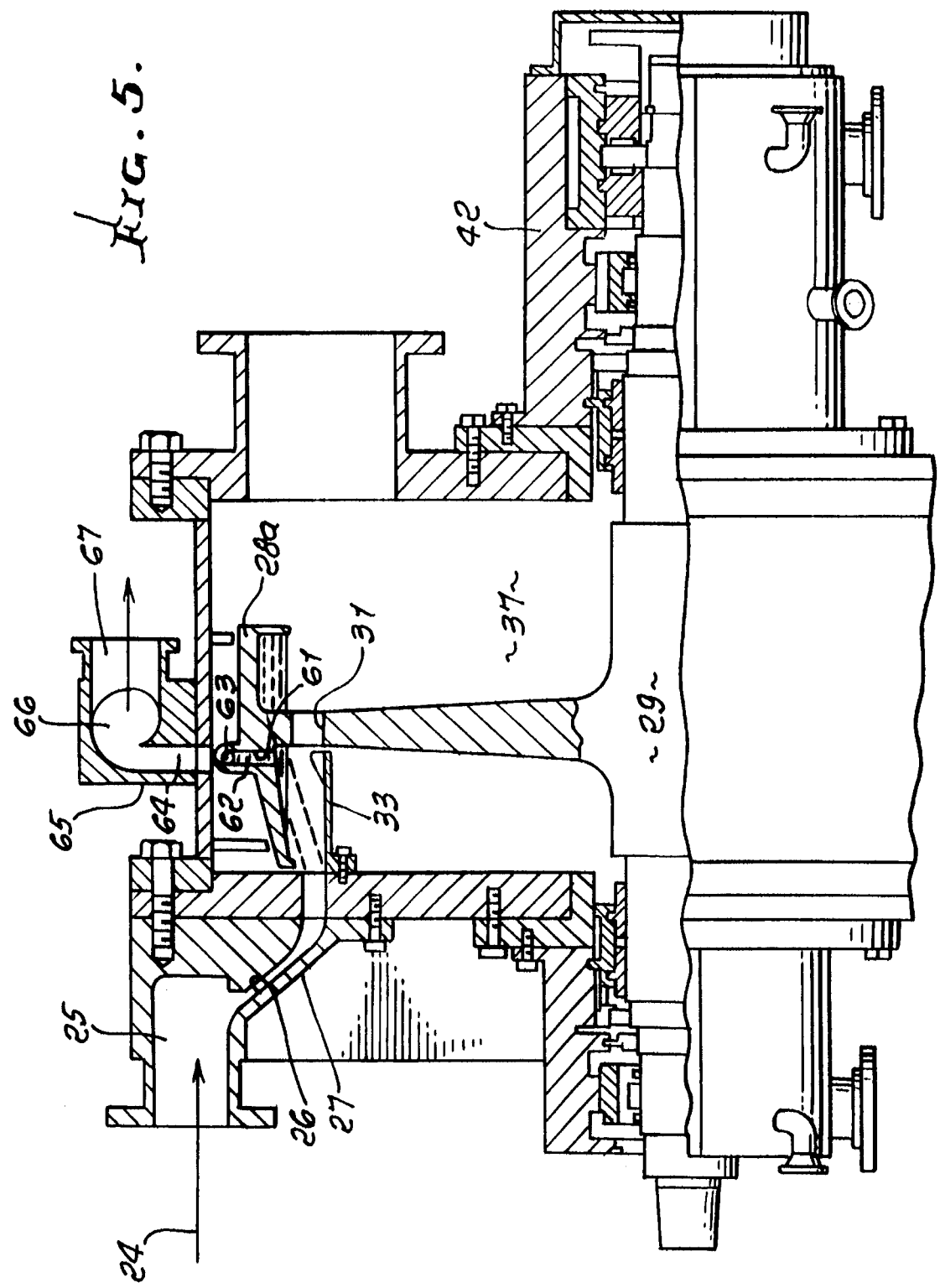

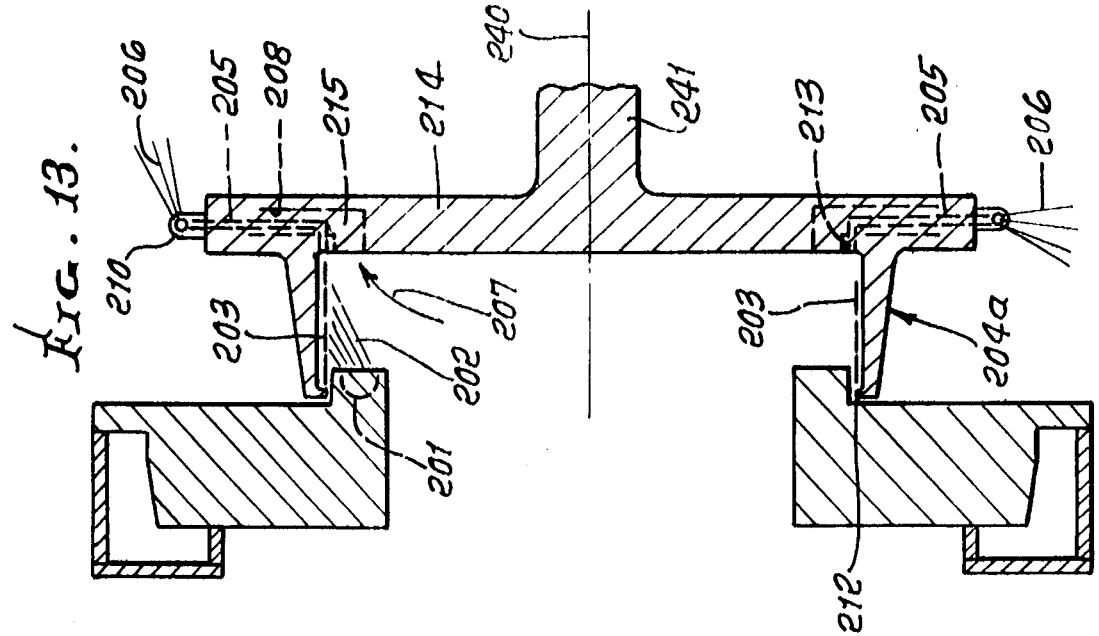
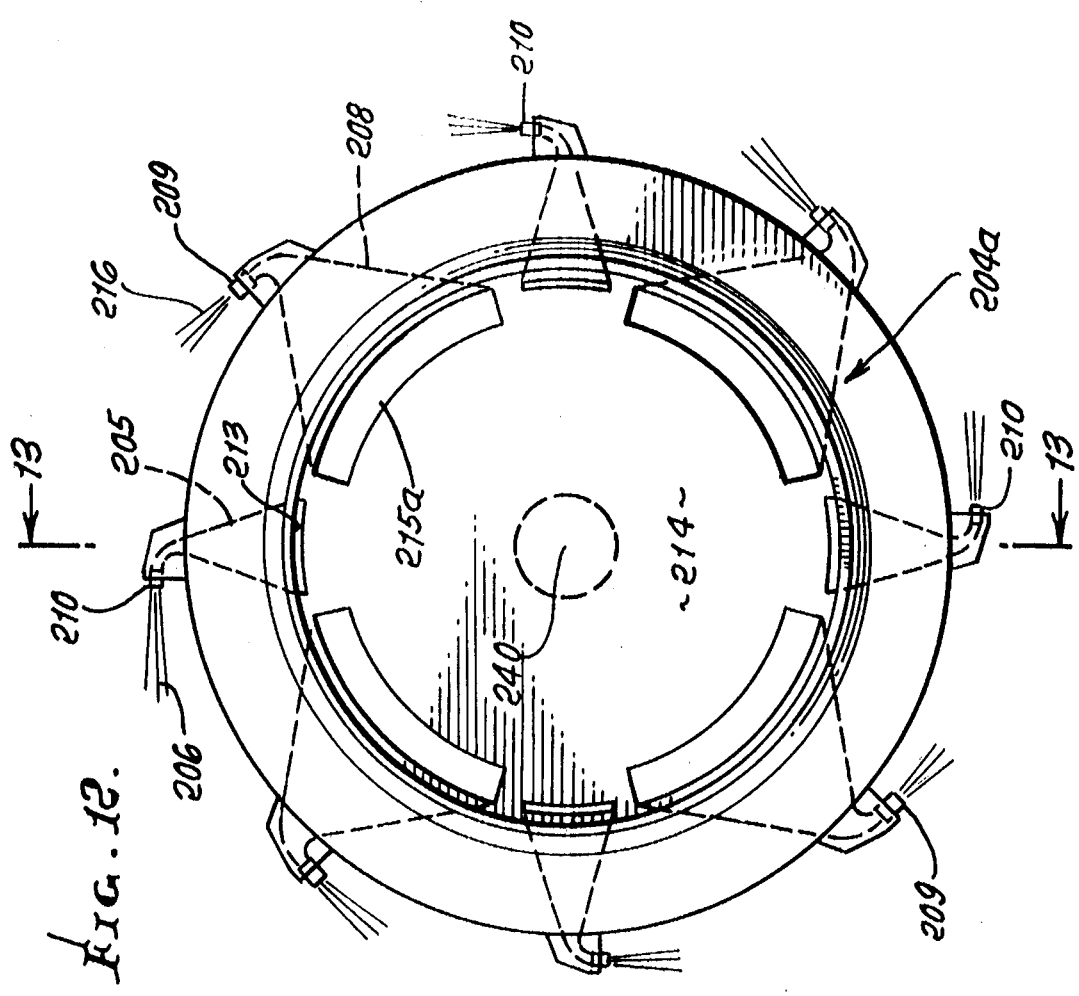

HYBRID TWO-PHASE TURBINE

BACKGROUND OF THE INVENTION

This application is a continuation-in-part of U.S. Ser. No. 07/878,605, filed May 5, 1992, now U.S. Pat. No. 5,385,446.

This invention relates generally to method and apparatus for converting energy in a two-phase (liquid and gas) fluid jet into mechanical power, as for example is delivered by a rotating turbine shaft. The liquid and gas may be two separate chemical components or may be the vapor and liquid phase of a single chemical component.

In the past, turbine equipment has been built to handle conversion of gas-phase energy or liquid-phase energy into shaft power. Other approaches have been attempted to convert the energy of both phases; however, problems then developed, including erosion, corrosion, and/or considerably lower efficiency. For example, a rotating separator has been employed to separate the liquid phase for conversion of kinetic energy of that phase into useful shaft power. However, the kinetic energy of the gas phase was dissipated.

In another example, a separator was not used, and the two-phase jet was directly impinged on moving turbine blades. Here again, kinetic energy of the gas phase was undesirably dissipated, and for high jet velocities, enhanced corrosion and erosion of the blades tended to occur.

Flash geothermal systems and some other processes dissipate the energy of two-phase flow, separate the gas, and then pass the gas through a gas-phase turbine. This approach wastes most of the available energy of the two-phase flow. (In a single component, two-phase system, such as steam and water, the dissipated energy makes heat which produces additional gas, which can produce some additional power in the gas-phase turbine; however, it is much less than the available energy of the two-phase flow.) This process wastes available energy in the two-phase flow.

There is need for improved means to convert both the gas energy and the liquid energy in a two-phase flow to useful power, whereby a considerable improvement in efficiency can be realized. For example, if the two-phase flow from a typical geothermal well is flashed and the steam is separated and used in a steam turbine, a total of 12,951 kW would be generated. If a suitable two-phase device is used to convert the liquid kinetic energy resulting from a two-phase expansion, a total of 15,014 kW would be generated by the device and a steam turbine, yielding a power increase of 16%.

SUMMARY OF THE INVENTION

It is a major object of the invention to provide improved method and apparatus meeting the above need, and including power generation from both liquid and gas phases.

Basically, power generation from a two-phase jet is achieved by a separation of the two-phase jet into gas and liquid streams for use in a rotating structure, so as to preserve most of the kinetic energy of the separated streams. The structure provides the means to separately convert the kinetic energy and enthalpy of the separated gas and of the separated liquid into shaft power.

In its apparatus aspects, rotary turbine equipment utilizing the invention has inlet means for mixtures of gas and liquid, and rotary shaft means, and a) separator means to receive the mixture of gas and liquid in a stream, and to separate the mixture into a stream of gas and at a stream of liquid, b) first means to receive the stream of gas for generating torque exerted on the shaft means, and c) second means to receive the stream of liquid for generating torque exerted on the shaft means, d) whereby the first and second means separately operate to generate shaft power.

As will appear, the stream of liquid has an associated velocity head, and the above second means typically may include a diffuser to receive the stream of liquid and to convert the velocity head thereof to pressure. Also, the mix of liquid and gas has an associated pressure and thermal energy, and the separator means typically may include a two-phase nozzle means for flowing the gas and liquid, and for converting the mixture pressure and thermal energy into kinetic energy and directing the streams of gas and liquid to the first and second means, respectively. That nozzle may have an adjustable area throat, as will be seen.

In addition, the above referenced second means may typically and advantageously include a surface rotating about an axis defined by the shaft means and at a velocity equal to or lower than the velocity of the separated stream of liquid, for receiving impingement of the stream of liquid to convert a portion of the kinetic energy thereof to shaft means energy by production of frictional forces formed by slowing the liquid stream to a velocity close to or equal to the velocity of the impingement surface.

Other objects include incorporation in the above referenced first means of radial inflow blades to receive impingement of the stream of gas and to convert the associated kinetic energy and enthalpy of the gas to shaft means energy; of axial flow blades to receive impingement of the stream of gas and to convert the associated kinetic energy and enthalpy of the gas into shaft means energy; and of radial outflow blades to receive impingement of the stream of gas and to convert the associated kinetic energy and enthalpy of the gas to shaft means energy. Shear discs may also be provided, as will be seen. Axial flow nozzles and axial flow blades may be provided on the shaft means to convert remaining kinetic energy and enthalpy of the separated gas to shaft power.

A further object includes incorporation in the separation means of radial passages for the separated liquid stream, and liquid nozzles terminating the outflow passages to pass the liquid stream and to convert the induced pressures of the radial outflow of the liquid to velocity of liquid jets, to convert the reaction forces of the liquid jets to shaft power.

Yet another object includes incorporation in the separation means of a gas-liquid separator surface or surfaces, a diffuser being located in the path of the separated liquid, the diffuser having a bleed of high pressure separated liquid directed to the separating surface to control the centrifugal liquid level of the separated liquid in the turbine, to minimize gas ingestion by the diffuser.

Additional objects include the provision of a) separator means to receive the mixture of gas and liquid, and to separate the mixture into a stream of gas and a stream of liquid, b) first means to receive the stream of gas for generating torque exerted on the shaft means, c) said separator means including a rotating surface to receive the stream of liquid to form a liquid layer, and for generating torque exerted on the shaft means, d) there being generally radial outflow passages for the separated liquid stream, and liquid nozzles terminating said outflow passages to pass the liquid stream and to convert the induced pressures of the radial outflow of said liquid to velocity of liquid jets, to convert the reaction forces of said liquid jets to shaft power.

Further, the separator means forms at least one lip adjacent said surface to block the liquid layer from flow past the lip, the outflow passages communicating with the liquid layer proximate the lip to receive liquid from the liquid layer centrifugally urged toward the passages.

The separator means also typically forms at least one gas escape slot or slots spaced radially inwardly relative to said lip, there being gas nozzles to receive the gas flow relatively outwardly from the escape slot or slots toward the gas nozzles, the gas flow subjected to centrifugal force to increase the gas pressure, the gas then expanding through the gas nozzles to produce gas jets directed to produce torque acting on said shaft means.

Also, multiple of the liquid and gas nozzles as referred to may alternate about the shaft axis, for dynamic and torque production balance, and may be directed counterclockwise.

These and other objects and advantages of the invention, as well as the details of an illustrative embodiment, will be more fully understood from the following specification and drawings, in which:

DRAWING DESCRIPTION

FIG. 5 is a view like FIG. 2 but showing integration of liquid reaction means into actual turbine structure;

Figure 11A:
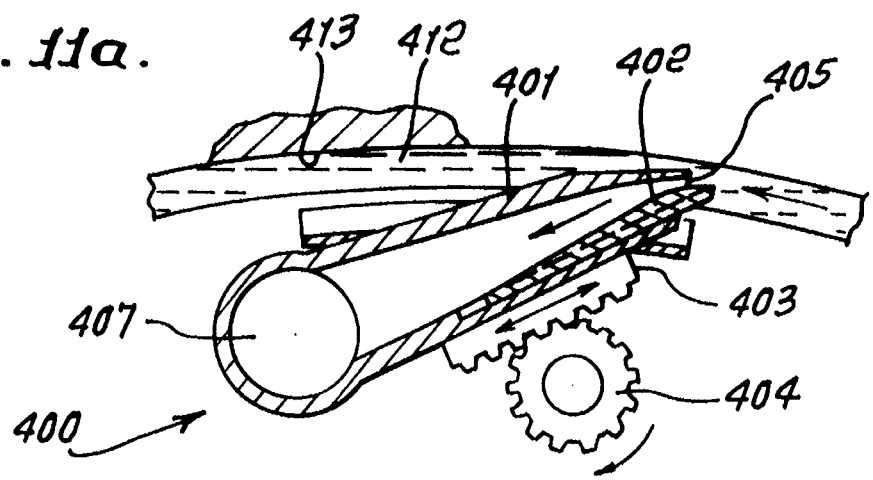
Figure 11B:
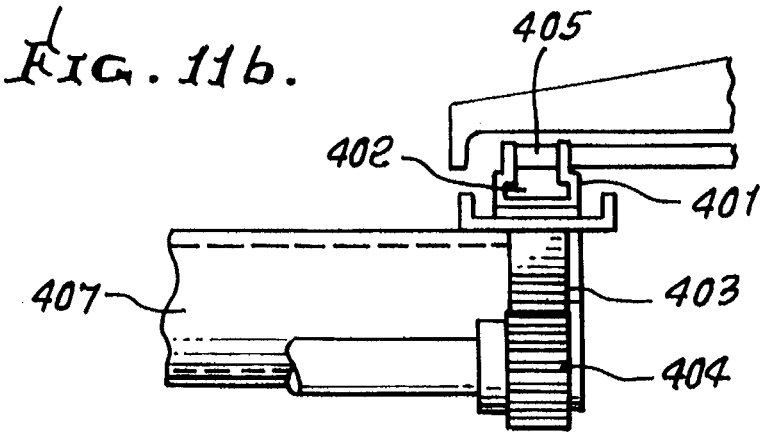
Figure 11C:
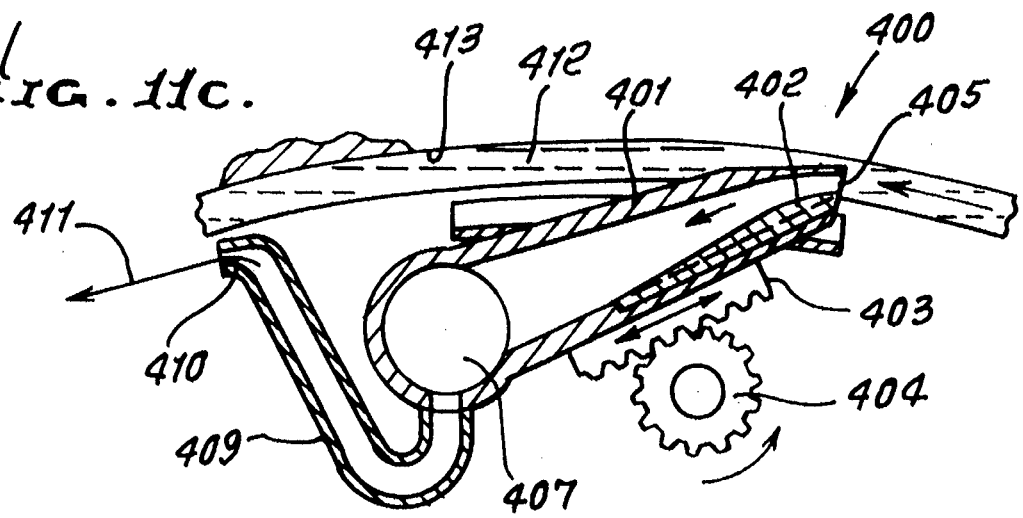
Figure 14:
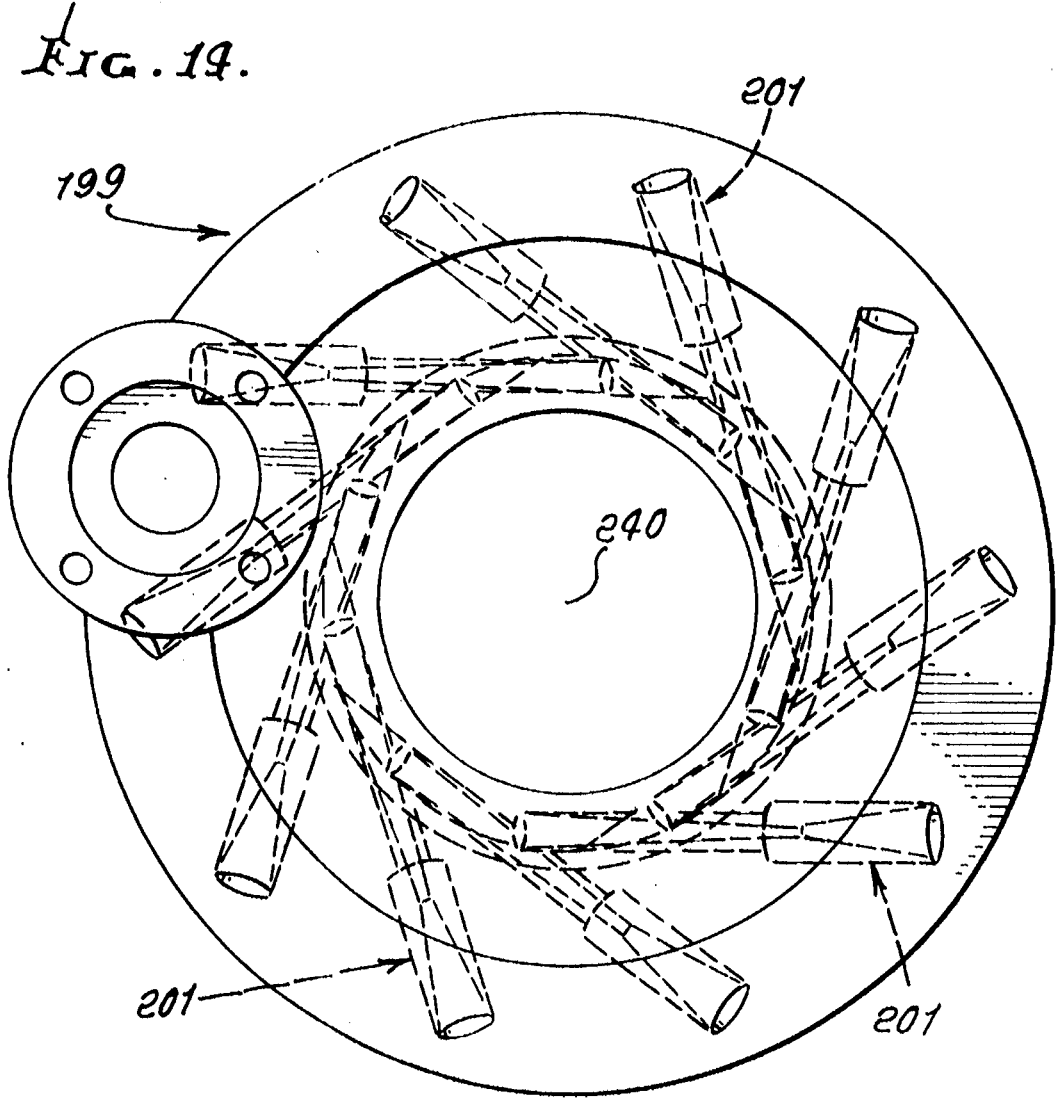
Figure 15:
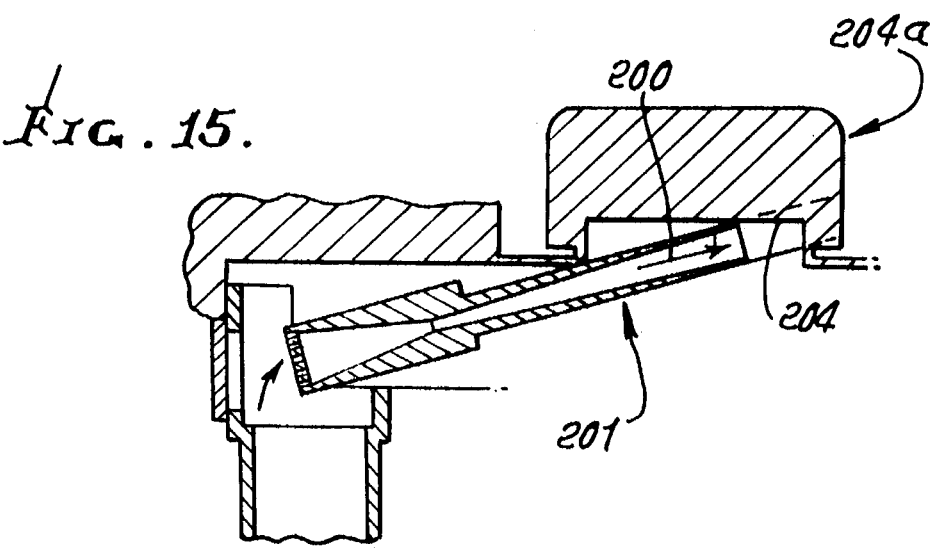

FIGS. 10(a)–10(e) are fragmentary cross sections showing adjustable nozzle throat structural details;

FIGS. 11(a)–11(c) are fragmentary cross sections showing diffuser details;

FIG. 12 is a schematic view showing further detail of a liquid reaction turbine;

FIG. 13 is a section taken on lines 13—13 of FIG. 12;

FIG. 14 is an axial view showing inlet nozzles;

FIG. 15 is an enlarged view showing a typical inlet nozzle in detail.

DETAILED DESCRIPTION

Figure 1:
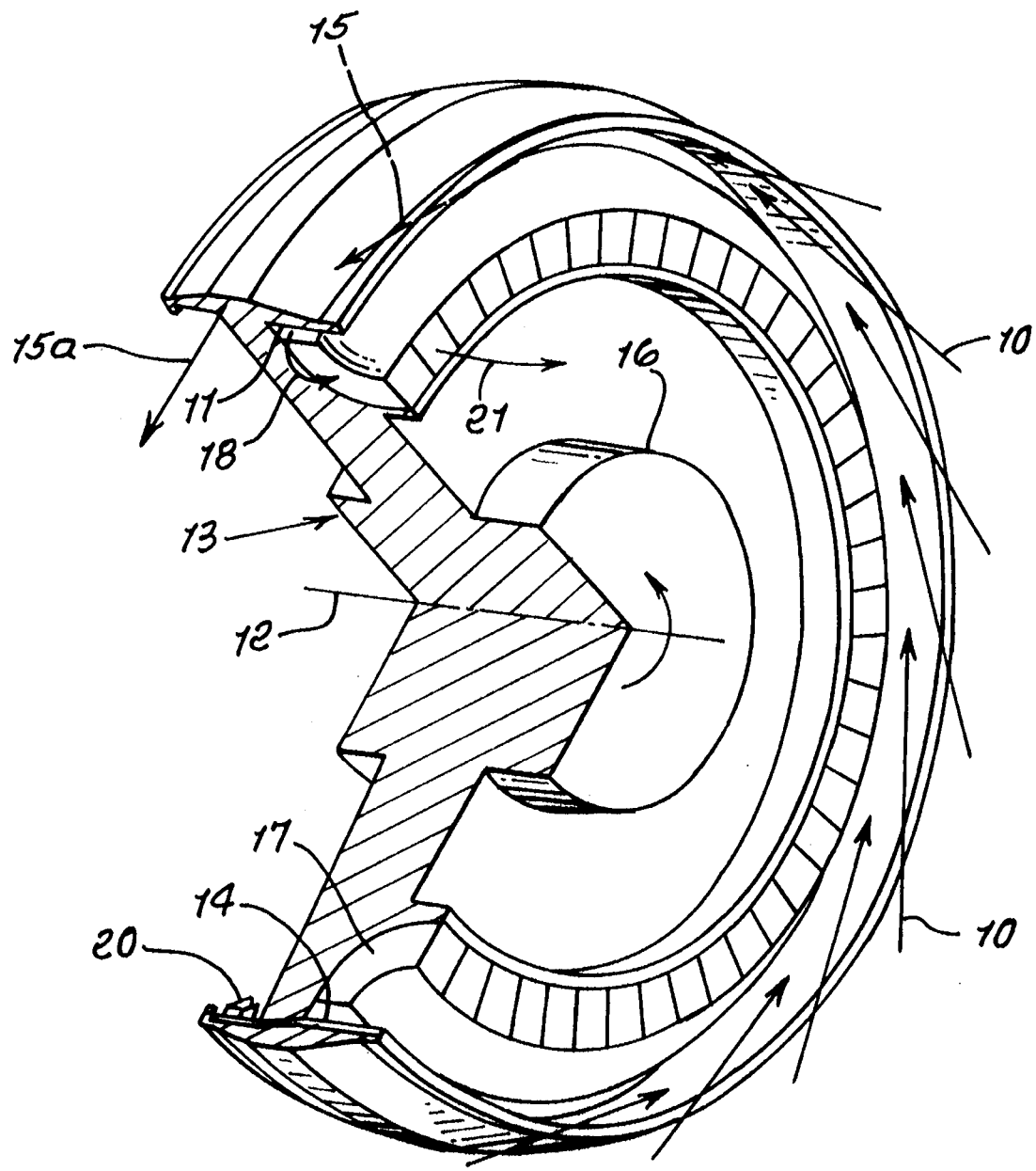
FIG. 1 is a diagrammatic view of structure to accomplish conversion of kinetic energy of both gas and liquid phases, of a two-phase jet, into rotary shaft power output.

FIG. 1 shows a structure to accomplish the conversion of the kinetic energy of both the gas phase and the liquid phase of a two-phase jet. The two-phase jet is directed in a generally tangential direction or directions 10 to a rotating surface 11 facing radially inwardly toward axis 12, surface 11 providing a rotor structure 13. Under the action of centrifugal forces resulting from the rotating surface, the liquid separates from the gas. The separated liquid layer 14 slows from its tangential velocity (indicated by arrow 15) at impingement to the tangential velocity of the rotating surface (indicated by arrow 15a). The liquid is decelerated to the tangential velocity by friction forces. The resulting drag forces on the rotating surface produce a torque and hence power transfer to the rotating structure 13. Power is produced at the single shaft 16 by this liquid energy conversion. Shaft 16 carries rotor 13.

The separated gas flows in a generally tangential direction in an annulus formed by the liquid layer 14 and a radial inflow gas blade structure 17. The gas enters the radial inflow blading and is directed radially inwardly (see arrow 18) by the blades. The radial momentum transferred by the gas to the blading by the gas, as its tangential velocity is decreased, produces a torque on the blade structure 17 and the rotating structure 13. Such torque produces additional power at the single shaft 16.

The separated layer of liquid is removed by a scoop 20. The scoop may be contoured with an area profile to slow the liquid tangential velocity 15a to a lower velocity, recovering residual kinetic energy as pressure.

The separated gas leaves the radial inflow blades in a generally axial direction 21. Residual enthalpy can be converted to shaft power in a separate gas phase turbine or by the addition of blading to the shaft 16.

The device shown utilizes the single rotating structure to:
a) separate gas from liquid efficiently,
b) generate power from the liquid phase,
c) generate power from the gas phase,
d) pump the separated liquid to a higher pressure.

The device accomplishes the above unexpected combination of items while avoiding erosion of the liquid conversion surfaces, which are protected by the liquid film. The device also accomplishes the unexpected combination of items while avoiding erosion of the gas blades by separating the liquid from the gas by the high centrifugal forces of the rotating surface.

Figure 2:
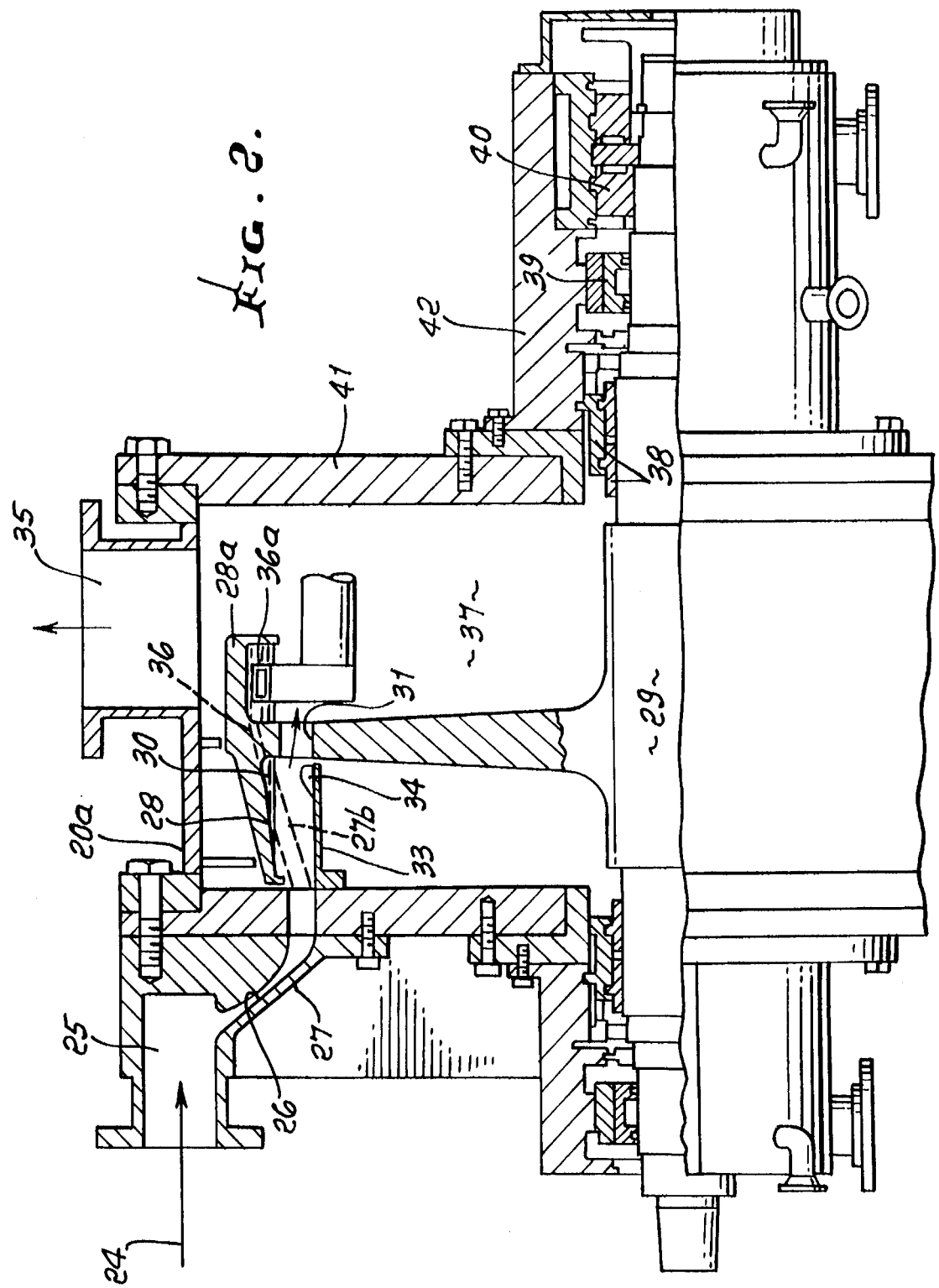
FIG. 2 is a section taken through actual turbine structure showing two-phase nozzle structure, separator means, blades, and other structure.

Other means to convert two-phase flow energy to useful power are shown in FIG. 2. A two-phase flow at generally high pressure 24 enters a two-phase nozzle structure inlet 25. The pressure of the flow is lowered in a two-phase nozzle passage 26 in non-rotating body 27. The lowering of pressure causes the two-phase mixture to be accelerated to a generally higher velocity.

The resulting two-phase jet 27b (see broken lines and arrow 27a) impinges in a generally tangential direction onto a rotating surface 28 on rotor 28a integral with shaft 29. The large centrifugal forces produced by the rotating surface result in separation of the gas phase from the liquid phase and in the formation of liquid layer 30 on the rotating surface 28.

FIG. 2 shows a cross section of the nozzle and device. The directions of the two-phase flow and separated liquid correspond to those shown in the drawing of FIG. 1.

Figure 2A:
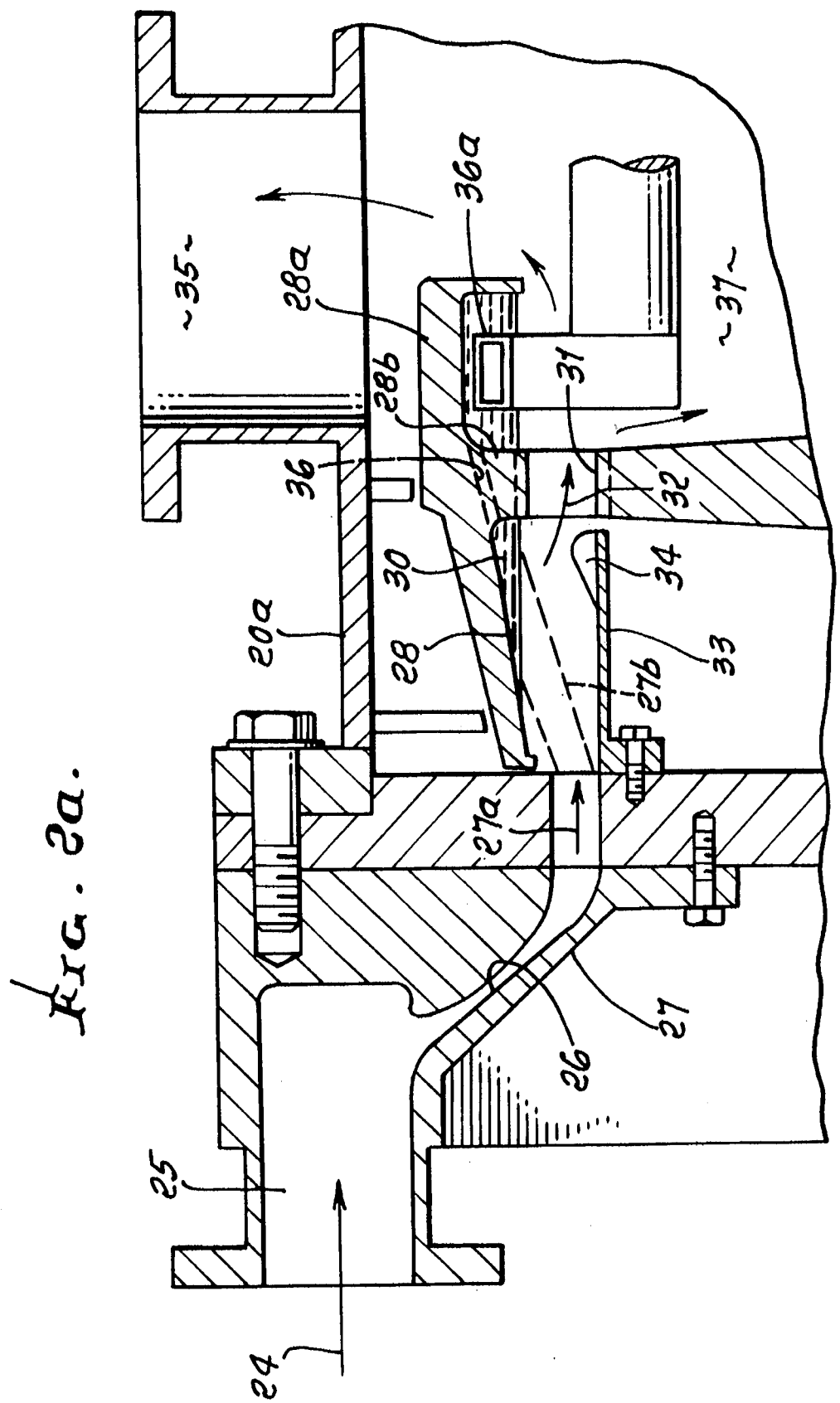
FIG. 2a is an enlarged fragmentary view showing two-phase nozzle means and separator structure.

The separated liquid film is slowed to the velocity of the rotating surface 18 by friction. The resulting drag forces produce a torque and power transfer to the single shaft 29. The separated gas 32 flows through axial steam blades at 31, on rotor 28a. See gas flow arrow 32, and also see FIG. 2a. The change in direction, caused by the blades, results in a force on the blades which also produces a torque and power transfer to the single shaft 29. A cylindrical guide 33 is provided to direct the separated gas to the blades, to minimize entrainment of surrounding stagnate gas. The guide may have radial vanes 34 to further minimize entrainment. After leaving the blades 31, the gas leaves the turbine through a port 35.

After the liquid is slowed to the velocity of the rotating surface, it flows through axial transfer holes 36 in 28a to the opposite side of the rotor disc 28b. The separated liquid is collected by a scoop 36a from this side of the rotor disc, the scoop penetrating liquid layer 30. The scoop may be contoured to efficiently slow the residual velocity of the liquid, generating pressure in the separated liquid.

The open volume 37 inside the casing 20a is filled with gas. The shaft seals 38, bearings 39, and thrust bearings 40 are conventional gas duty components. Casing structure appears at 41 and 42. If the device is used to pressurize a corrosive liquid, such as geothermal brine, the reliability of pumping is much greater than a normal pump. This unexpected result occurs because the seals and bearings are only exposed to clean gas at 37, instead of the corrosive liquid.

The two-phase nozzles 26 spaced about shaft 29 and used for accelerating two-phase flow for power conversion in the turbine may have axisymmetric or rectilinear design.

Figure 3:
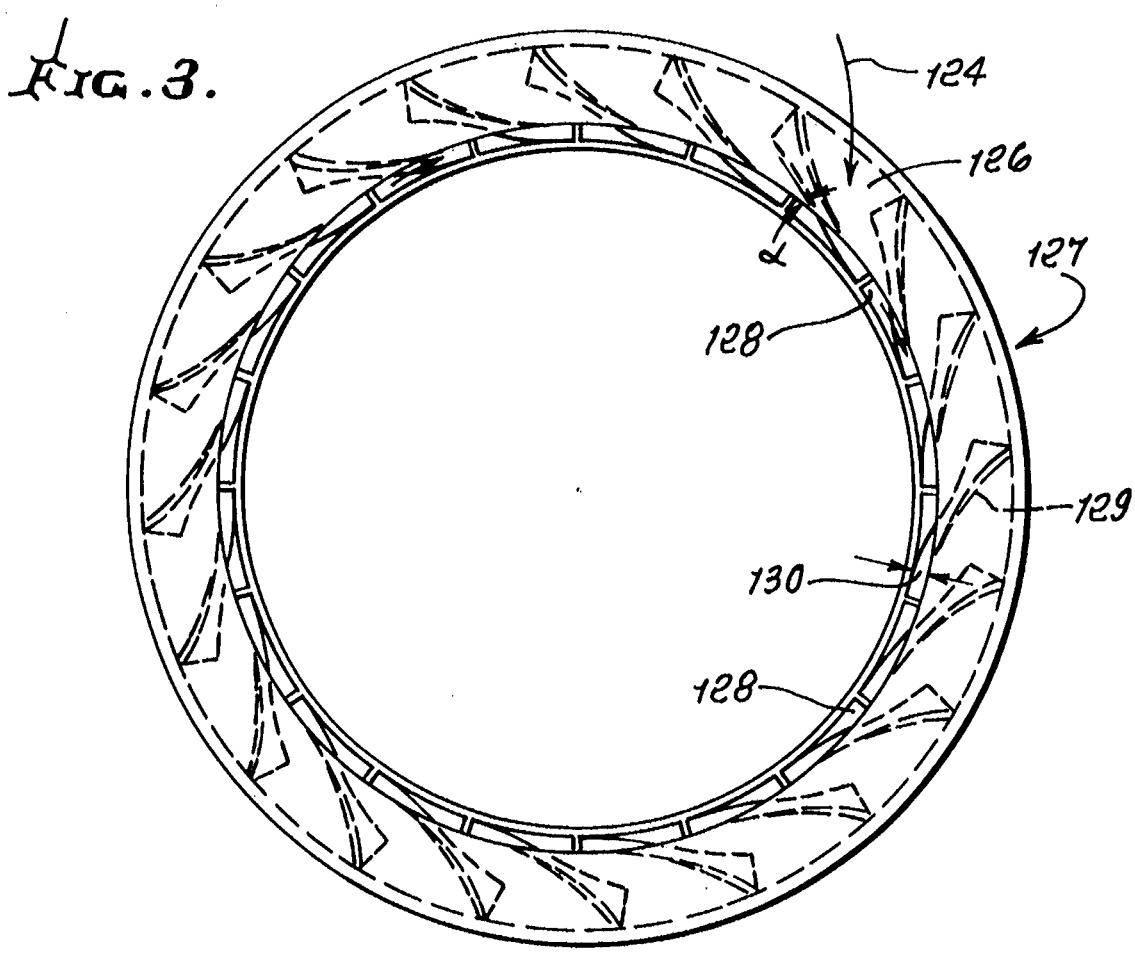
FIG. 3 is an end view showing rectilinear, two-phase nozzles disposed in an annular configuration.

FIG. 3 shows a two-phase nozzle which improves the performance of axisymmetric geometries by having a rectilinear cross section normal to the direction of flow.

Flow 124 entering the two-phase nozzle 126 is at relatively high pressure. The flow is accelerated to higher velocities as it flows to the nozzle exits from nozzle ring 127 corresponding to ring 27 in FIG. 2. Side walls 129 are provided to guide the flow so that it leaves the like nozzles at the desired angle α to the plane perpendicular to the axis of the turbine to which the flow is introduced.

The advantage of the two-dimensional geometry is that the height 130 of the nozzle can be minimized. The momentum energy loss due to a finite nozzle height is:

$$LOSS = 1.0 - (D-h)^2/D^2 \qquad (1)$$

Where:
D=Diameter of separating surface
h=Height of nozzle exit
For an axisymmetric nozzle, the exit area is:

$$A = (0.785)(d^2) \qquad (2)$$

Where:
d=diameter of axisymmetric nozzle
w=width of two dimensional nozzle
For a two dimensional geometry, the exit area is:

$$A = (h)(w) \qquad (3)$$

For equal areas, the height, h, is given by:

$$h = (0.785)(d^2)/(w) \qquad (4)$$

For d=1.0 and w=5, h=0.157, these being units of measurement. Thus, the height of the two dimensional nozzle exit height is only 0.157 times the height of the axisymmetric nozzle for this example. If the separating surface diameter is 6.0, the loss with an axisymmetric nozzle is 0.3055 times the kinetic energy of the two-phase flow leaving the nozzle. The loss with the two-dimensional nozzle above is only 0.0516 times the kinetic energy.

The nozzles of FIG. 3 can be designed so that all guide vanes and exit streamlines have a constant angle to the plane perpendicular to the axis of the turbine into which the jet flows. Since the loss of kinetic energy is proportional to 1.0 minus the cosine of that angle c squared, the minimum loss will occur for equal angles.

Other means can be provided to convert the kinetic energy of the separated liquid into shaft power in conjunction with either of the gas blading concepts shown.

Figure 4:
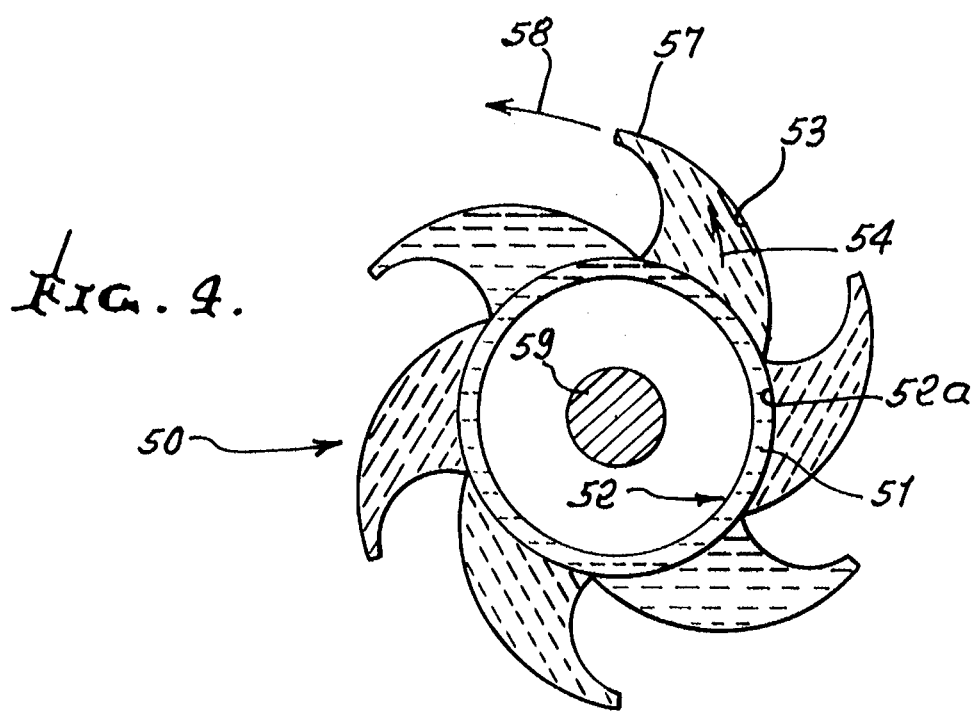
FIG. 4 is a schematic showing of a liquid reaction turbine.

FIG. 4 schematically shows a liquid reaction turbine 50 which can be used. The separated and centrifuged liquid 51 flows onto the rotor 52 separating surface 52a at the rotary speed of that surface. The separated liquid transfers power to the rotor under the action of the frictional forces, as described in FIGS. 1 and 2. A passage 53 is provided in the rotor for the liquid to flow radially outward, at 54. The centrifugal force field resulting from the rotation of the separating structure causes an increasing pressure in the liquid as it flows outward. At the end of the radial passage, a liquid nozzle 57 is provided. The liquid accelerates through the nozzle and leaves the rotating structure at a relatively high velocity. See arrow 58. The reaction force from the leaving high velocity liquid jet produces a torque, which is exerted via rotor 52 onto shaft 59 and converted to shaft power. In this regard, the disclosure of U.S. Pat. No. 4,298,311 is incorporated herein, by reference.

Figure 5A:
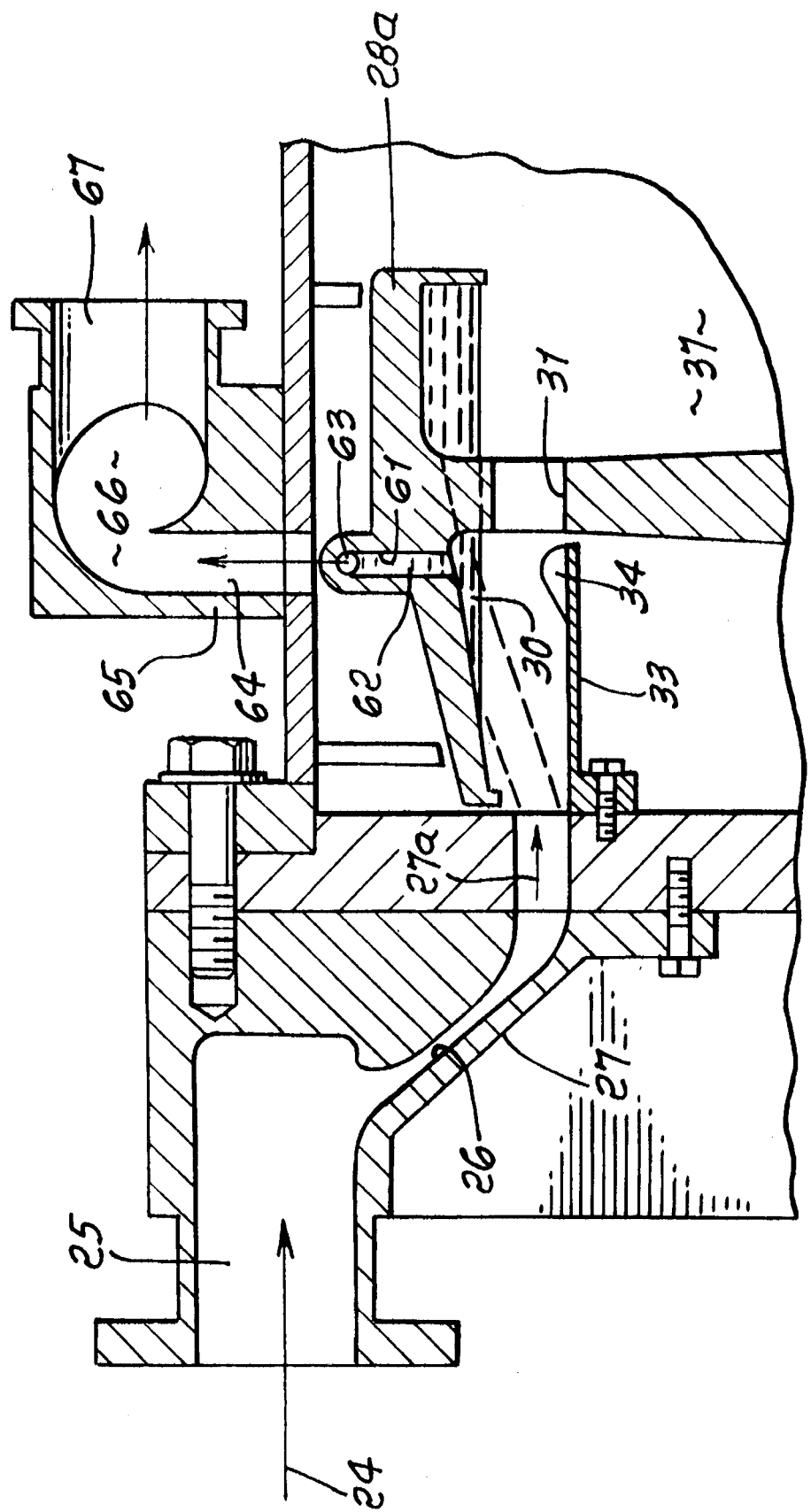
FIG. 5a is an enlarged fragmentary view showing turbine two-phase nozzle means, phase separator structure, and a liquid reaction passage and nozzle.

FIGS. 5 and 5a are cross sections showing the integration of the liquid reaction means into the turbine structure of FIG. 2. A radial passage 61 is provided for radial outflow of the separated liquid. The separated liquid flows radially outward at 62 and is accelerated through a liquid nozzle 63. The jet flows through a narrow passage 64 in annulus 65 on the turbine casing. The flow passage is configured so that the jet sweeps out any back flow of liquid. The liquid is collected in a collector passage 66 and leaves through a port 67. The reaction forces from the jet leaving the separation structure on 28a at high velocity produce a torque which is exerted via rotor 28a and is additive to the torque produced by the liquid drag forces and by the separated gas being turned by the axial flow blades. The result is that the power produced by all three sources is transmitted by the single shaft 29.

Figure 6:
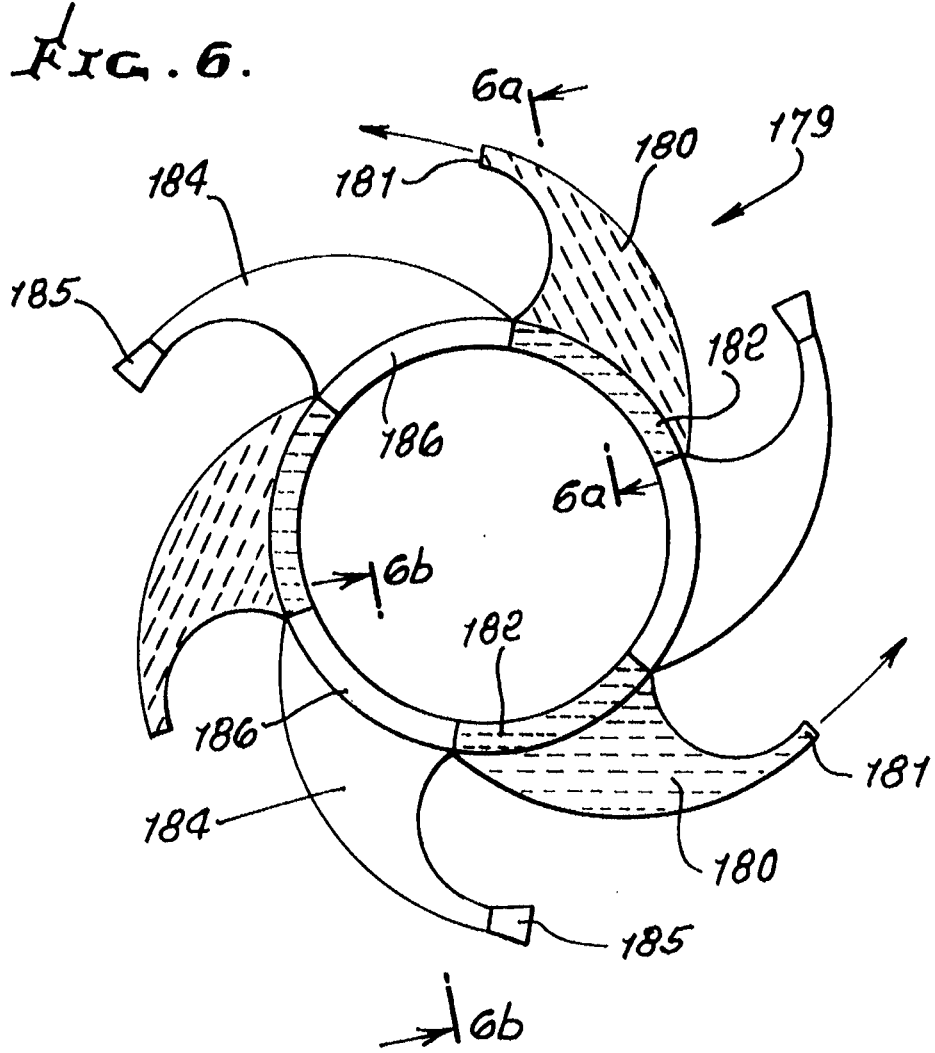
FIG. 6 is a view like FIG. 4 showing radial outflow gas passages as well as liquid passages.
Figure 6A:
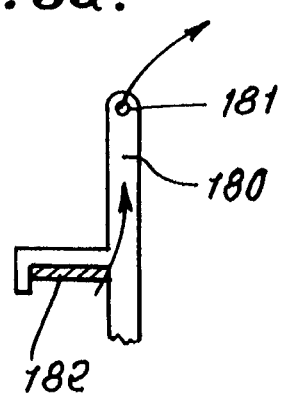
FIG. 6a is a section taken on lines 6a—6a of FIG. 6.
Figure 6B:
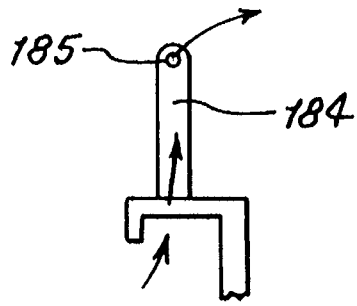
FIG. 6b is a section taken on lines 6b—6b of FIG. 6.

FIGS. 6 through 6b are similar to FIG. 4, but show a two-phase turbine rotor 179 having liquid reaction passages 180 and associated nozzles 181 for liquid supplied from separation ring segments 182, to convert the liquid kinetic energy to shaft power. Also, radial outflow gas passages 184 and nozzles 185 receive separated gas from ring segment zones 186 to convert the separated gas kinetic energy and enthalpy to shaft power. In another configuration, radial outflow blades may be used instead of the passages 184 and nozzles 185 to convert the gas kinetic energy to shaft power.

Figure 7:
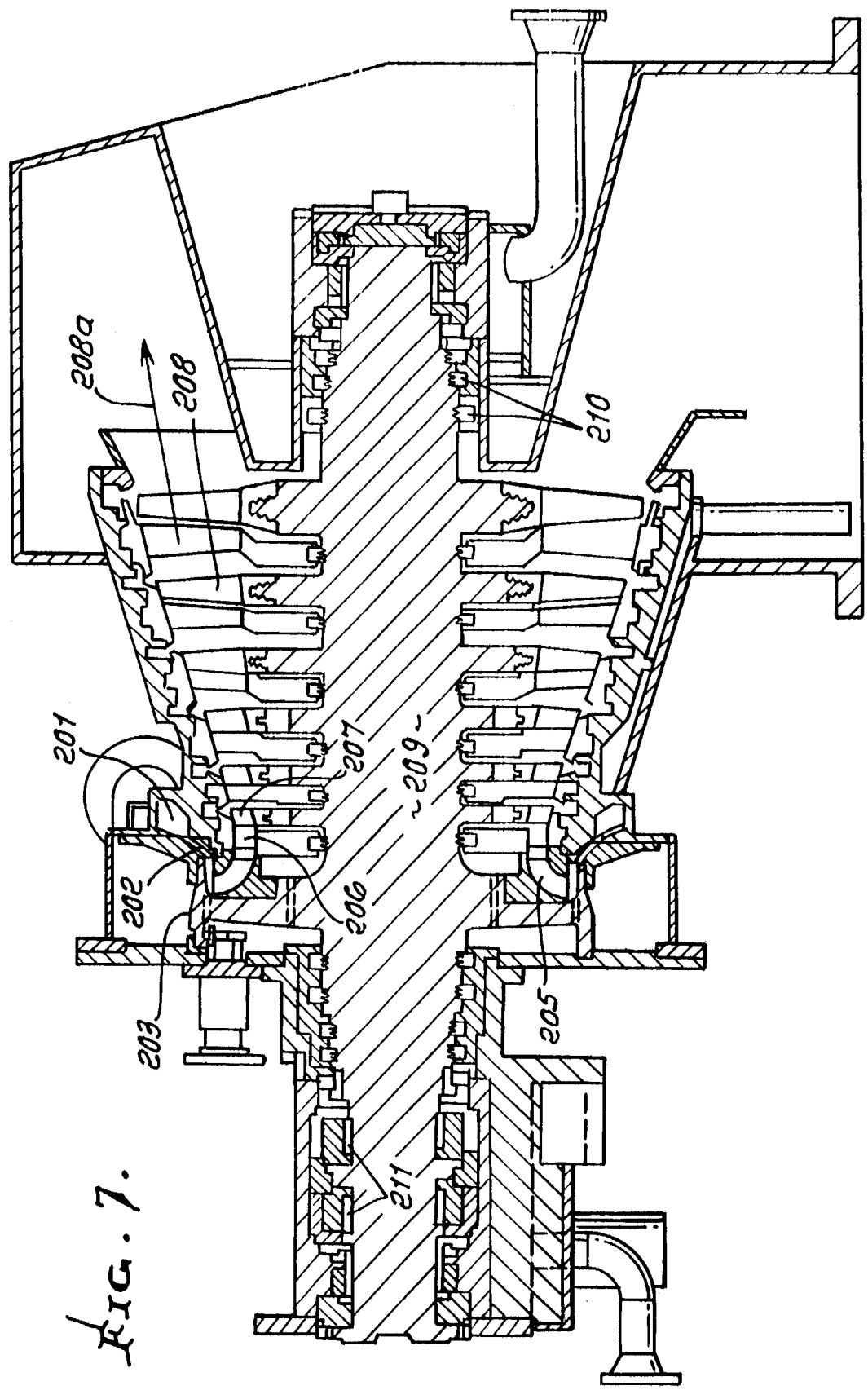
FIG. 7 is a section taken through an actual turbine structure wherein remaining enthalpy of the gas leaving separator structure of the type shown in FIGS. 1, 2, 4, 5, and 6 is converted to shaft power by using axial flow blades and nozzles.
Figure 7A:
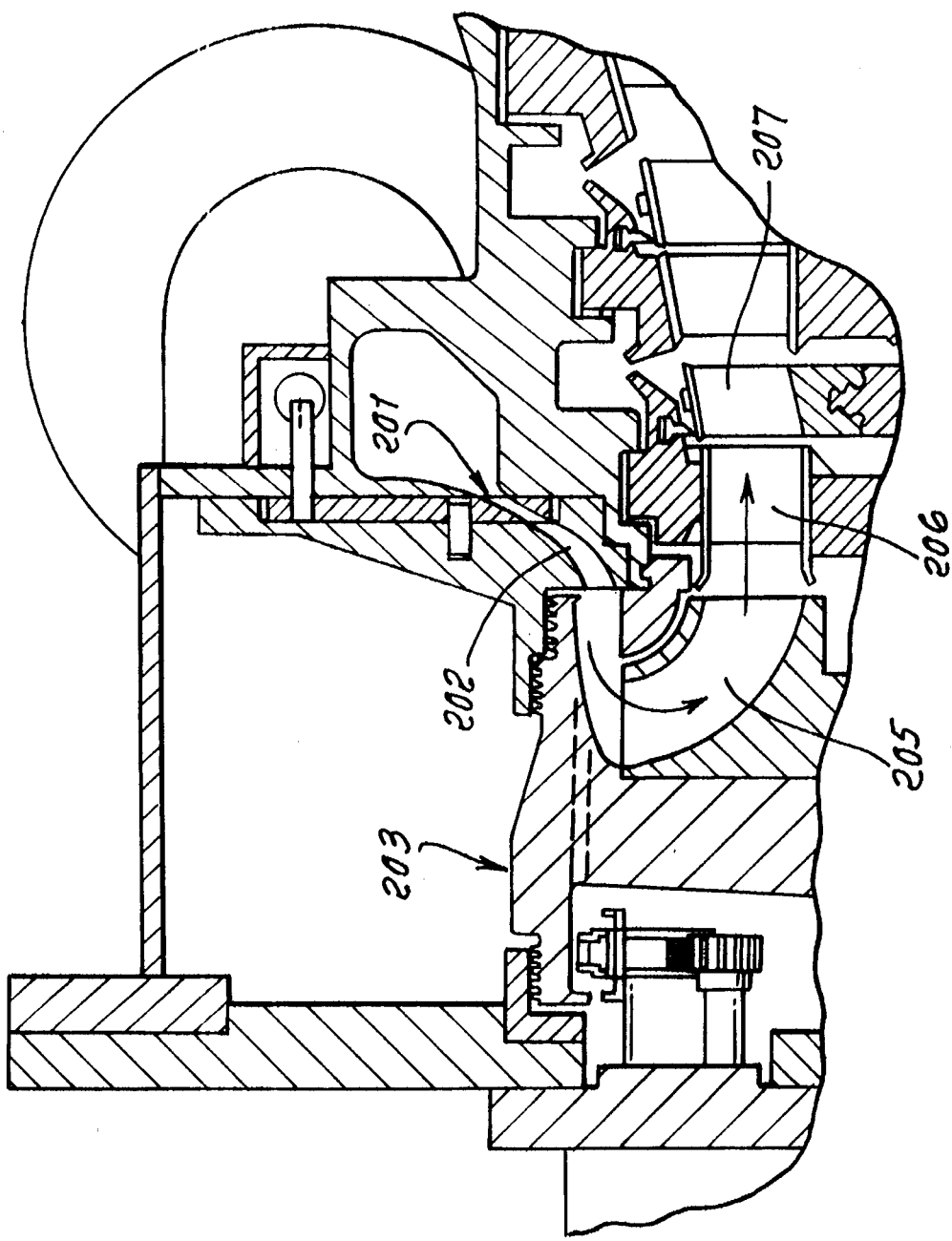
FIG. 7a is an enlarged section showing parts of FIG. 7.

FIGS. 7 and 7a show a turbine where the remaining enthalpy of the gas leaving a two-phase rotary separator turbine of the types described in FIGS. 1, 2, 4, 5, and 6 is converted to shaft power on the same shaft by adding axial flow gas blades and nozzles. Two-phase flow is introduced to the nozzle at 201. The flow is accelerated in the nozzle 202 to a relatively high velocity. Liquid is separated and decelerated by the rotary separator rotor 203, converting the kinetic energy of the separated liquid to shaft power. The separated steam flows through radial inflow gas blading 205, converting the kinetic energy and some enthalpy of the separated gas to additional shaft power. The gas leaving the rotary separator first stage is accelerated in a stationary gas nozzle 206. The relatively high-velocity gas is passed through gas blading 207, attached to the common rotating shaft 209. The gas passes through additional gas phase turbine stages, as required, to convert the gas enthalpy to power of the common shaft 209. The gas leaves the gas phase turbine stages 208 at 208a and is exhausted to a condenser or process use. The combined turbine has conventional seals 210 and bearings 211 for the gas phase.

The combined geometry, when applied to steam flows, enables wet steam to be used to generate power directly in a turbine.

Figure 8:
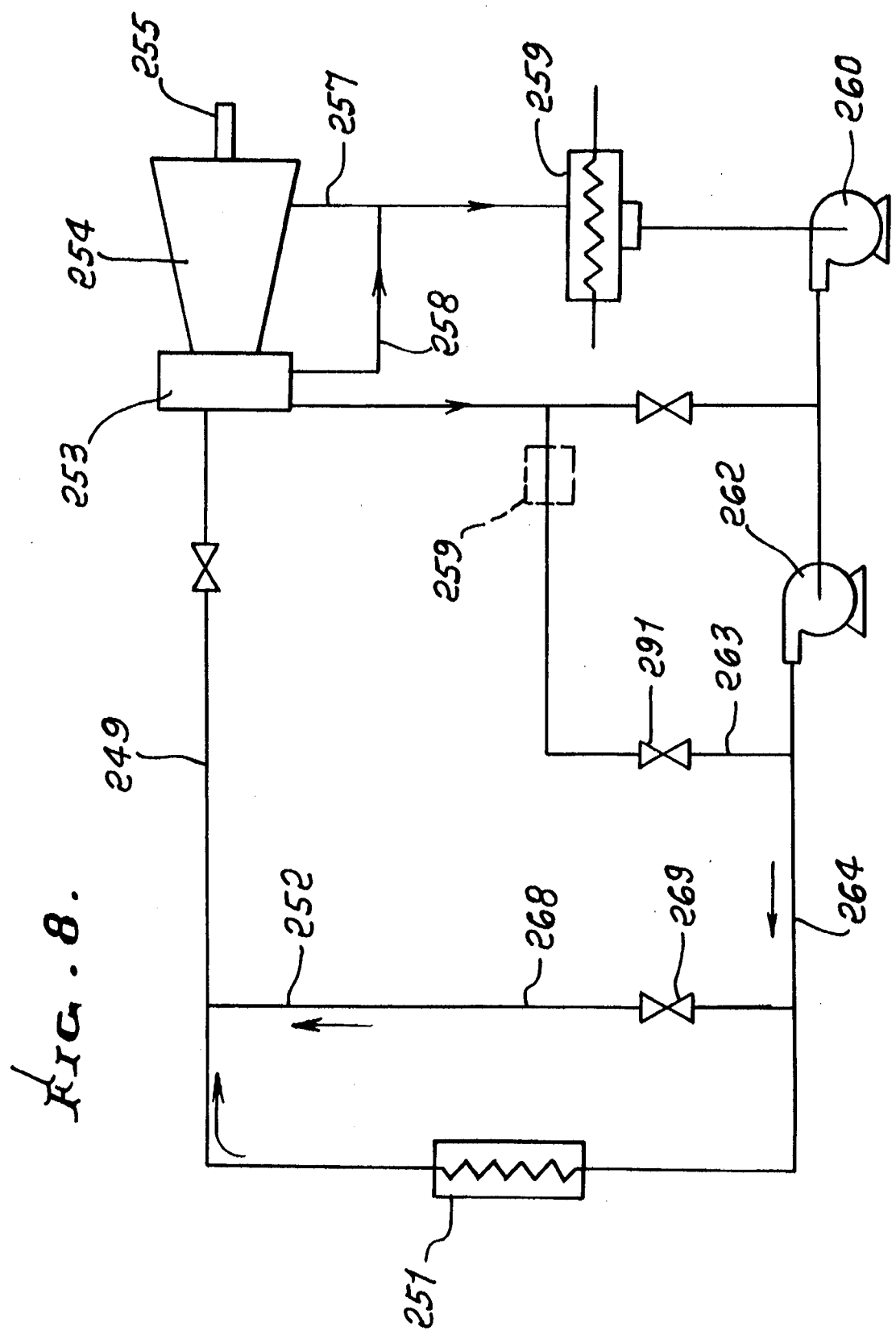
FIG. 8 is a flow diagram showing a steam engine that can be operated using wet steam.

FIG. 8 shows a steam engine which can be operated with wet steam. Steam is generated in a heat exchanger or boiler 251. The steam may be dry, moderately wet (for example 70%–80% steam quality) or very wet (saturated water to 70% steam quality). If the steam quality is at the required value, the two-phase flow 249 may be introduced directly to the rotary separator turbine stage 253. If a lower steam quality is required than the steam quality provided by the heat exchanger, water may be injected at 252 to lower the steam quality. The steam separated and leaving the rotary separator turbine stage passes through the gas phase turbine stages 254. The power generated by the separated liquid and gas is transmitted from the single shaft 255. Steam leaving the seals at 258 and steam leaving the turbine at 257 is condensed in a condenser 259. The condensate is pressurized by a pump 260. The liquid leaving the rotary separator stage at 253 can be pressurized by an internal diffuser. If so, it is routed by valve 291 upstream at 263 of the feed pump 262 and mixes with the condensate. The resulting flow at 264 is routed to the heat exchanger 251. If required, a part of the return flow 264 can be routed at 268 by valve 269 to be mixed with the flow from the heat exchanger.

The following advantages pertain to a wet steam engine compared to a dry, saturated steam engine:

1) The wet steam heat exchanger is much smaller than a dry steam heat exchanger. No separator to obtain dry steam is required. The heat transfer coefficients on the steam side are much higher because of the relatively wet steam flow.

2) The steam wetness in the steam stages of the wet steam turbine is lower than for a dry, saturated steam turbine having the same inlet pressure as the rotary separator turbine stage. This is because the rotary separator stage removes the water phase, producing dry, saturated steam for the steam turbine stages at a lower pressure than for the dry, saturated steam turbine. The turbine blade efficiency is therefore higher and the erosion potential is much less. This is a completely unexpected result of using the rotary separator turbine in conjunction with conventional steam turbine blading. It would not be obvious that a wet steam turbine would have less erosion potential and a higher blade efficiency than a turbine to which dry steam was admitted.

3) Because of the increased blade efficiency and the feedwater heating from the separated water, the wet steam engine efficiency is higher than a simple, dry, saturated steam engine at the same maximum temperature.

Figure 9:
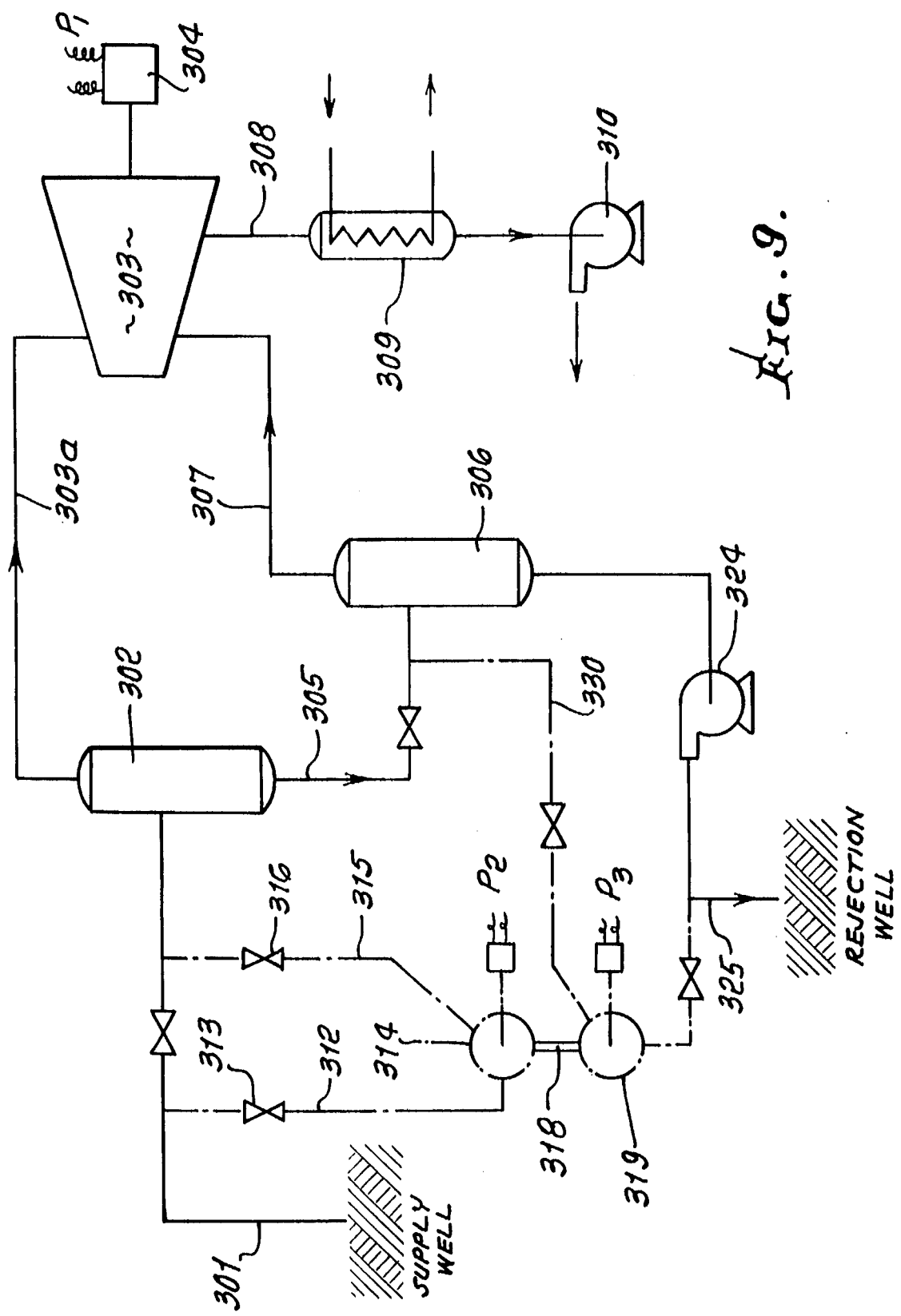
FIG. 9 is a flow diagram showing use of a two-phase turbine in a double flash geothermal power plant.
Figure 10A:
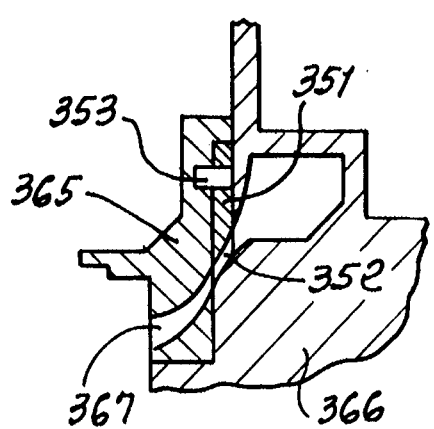
Figure 10B:
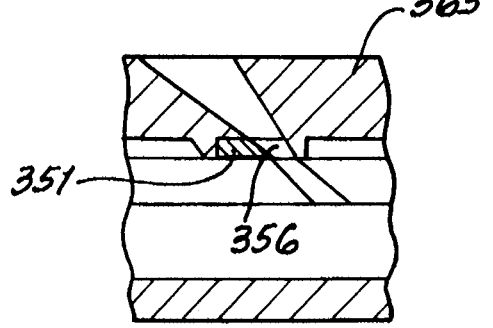
Figure 10C:
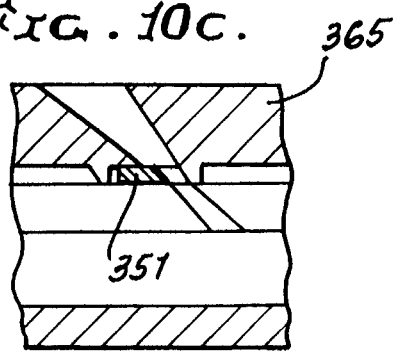
Figure 10D:
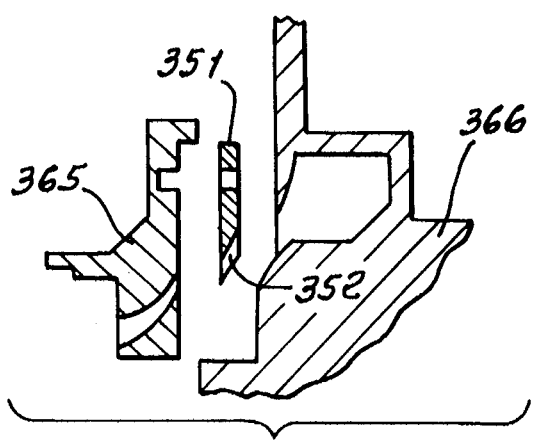
Figure 10E:
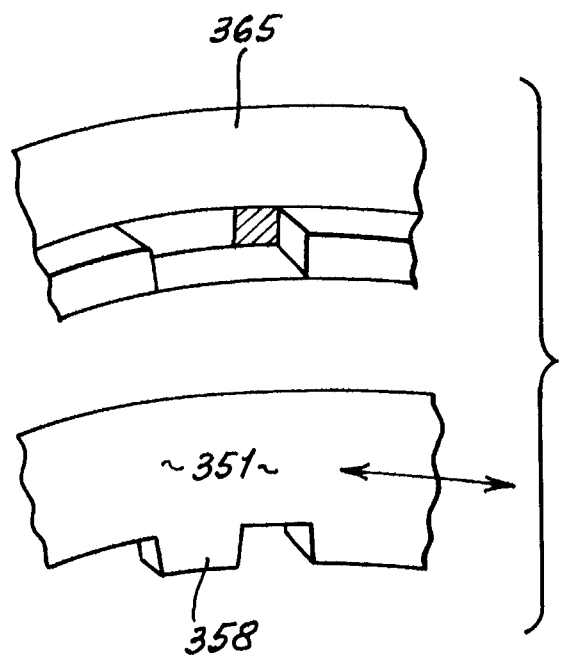

Another application of the rotary separator turbine is to improve the efficiency of geothermal power plants. FIG. 9 illustrates this application. In a conventional flash steam geothermal plant, two-phase flow from a geothermal well 301 at a relatively high pressure $p_1$ is piped to a flash tank 302. The two-phase flow flashes to a lower pressure $p_2$. This isenthalpic lowering of pressure produces additional steam, but no power. The steam is separated and flows at 303a to a steam turbine 303, which drives a generator 304, producing electrical power in the amount of $P_1$. The steam leaving the steam turbine at 308 is condensed in a condenser 309, and the condensate is pressurized by a pump 310. The separated brine 305 may be pressurized and reinjected into the ground or it may be piped to a lower pressure flash tank 306 where the pressure is lowered, producing additional steam at a pressure of $p_3$. The lower pressure steam at 307 can be admitted to a low pressure port of the steam turbine to produce additional power (or it can be used for other power-producing purposes, such as driving a turbocompressor).

A rotary separator turbine 314 can be installed in a flow circuit parallel to the two-phase flow line and high pressure flash tank 302. Two-phase flow is routed at 312 by valve 313 through this circuit to the high pressure rotary separator turbine 314 (RST). The pressure is reduced in the RST 314 from $p_1$ to $p_2$, producing additional steam and power $P_2$. The separated steam at $p_2$ is piped at 315 to the flash tank 302, producing identical steam conditions as the conventional flash system. The amount of steam is reduced slightly by the energy equivalent of the power generated $P_2$ by the RST. Isolation valves 313 and 316 are provided so that the flash steam system and steam turbine can continue to operate even when the RST is shutdown. The separated brine 318 from the RST may either be reinjected into the ground or it may be piped to a low pressure RST 319. The brine can be flashed to $p_3$ in the low pressure RST, producing additional power $P_3$. The separated low pressure steam is piped at 330 to the low pressure flash tank 306 at the same conditions as the conventional flash system. The separated brine can be repressurized by the low pressure RST 319 so that it can be reinjected at 325 without a pump 324, which reduces the plant auxiliary power requirements.

Table 1 shows the power added by the RST to a typical high pressure geothermal well. A total gain of 16% is obtained after taking into account the small decrease in steam flow and steam turbine power.

TABLE 1

$p_1$ = 939 psia
$p_2$ = 202 psia
m = 131 lbls
$h_1$ = 1198.5 Btu/lb
$P_1 + P_2$ = 15,014 kW
$P_{flash}$ = 12,951 kW where:
$p_1$=wellhead pressure
$p_2$=steam pressure
m=total flow rate
$h_1$=wellhead enthalpy
$P_1+P_2$=total power of two phase turbine and steam turbine
$P_{flash}$=steam turbine power from flash alone.

The RST can be made to be more flexible and controllable if the two-phase nozzle throat area can be varied. FIG. 10 shows one method to vary the throat of a two-dimensional nozzle. A movable plate 351 is provided at the throat 352 of the nozzle. An actuator 353 is provided to move the plate in a direction perpendicular to the axis of the RST. For a set of nozzles around the periphery of the RST, the plate can be a circular segment which is rotated under the action of the actuator. The plate has teeth 358 which protrude into the nozzle throat passage 356. In the fully open position, the teeth 358 are translated to a position such that the throat passage is wide open. To throttle the flow, the plate is translated so that the teeth block part of the throat passage 356. The resulting reduction in area lowers the flow rate through the nozzle. The abrupt change in area produces a high local pressure gradient which atomizes the droplets and can produce a higher nozzle efficiency. Other elements show intake nozzle cap 365, top housing 366, and nozzle inlet 367.

Improvement in the diffuser performance and reduction in noise is possible if the amount of gas ingested can be reduced. Means to accomplish this are shown in FIG. 11. Gas ingestion can occur when the surface of the liquid layer does not fill the diffuser 400 entrance 405. One way to fill the opening is to reduce the size of the opening. A movable, contoured insert 402 is provided within the diffuser body 401. The insert is attached to a structure 403 with linear gear teeth which is translated by a gear 404 on a shaft. Translation of the insert results in enlarging or reducing the size of the diffuser opening. The insert is sealed by elastomer or bellows seals. The resulting collected liquid flow is pressurized and leaves the RST through a pipe 407.

Another method to reduce gas ingestion is to reintroduce a part of the collected flow into the liquid layer to increase the depth of the layer so that the diffuser opening is more completely filled. Part of the flow collected is routed through a pipe 409 to a nozzle 410. A jet 411 is produced, which is directed into the flow 412 on the rotary separator surface 413, which faces toward the shaft axis. The recirculating flow increases the mass flow entering the diffuser opening causing an increase in flow area. The diffuser inefficiency and the liquid nozzle inefficiency result in a velocity of the liquid jet 411, which is lower than the velocity of the liquid layer 412. This effect also increases the flow area.

In the form of the invention seen in FIGS. 12-15 two phase nozzles 201 are used to accelerate a gas-liquid mixture 200, forming a high velocity two-phase jet 202. The two-phase jet impinges tangentially onto a rotating separation surface 204 on a separator 204a forming a liquid layer 203, and a gas flow 207. Separator 204a rotates about axis 240 of shaft 241.

The liquid (such as water) enters a slot or hole 213 in 204a and which is radially outward relative to the radius of lip or dam 212, which restrains the liquid layer. The liquid flows radially outward at low velocity through liquid passages 205, in the rotor 214.

The centrifugal force field causes an increase in pressure as the liquid flows outward. At the exit of the passages 205 the liquid is accelerated through a liquid nozzle 210, to a lower pressure forming a jet 206. The reaction force from the jet, produces a torque on the shaft 241. Nozzles 210 are directed counterclockwise as shown.

The separated gas flow 207, flows into a gas slot or hole 215 in 204a, which is radially inward (i.e. toward axis 240) from the radius to the lip 212 that restrains the liquid. Because the separated liquid as at layer 203 is forced by the centrifugal force field to be radially outward of the gas slots 215, liquid is precluded from entering with the gas into the gas slots 215.

The gas entering a slot 215 flows radially outward through the gas passages 208 in 204a at low velocity. The centrifugal force field causes an increase in gas pressure as the gas flows outward.

At the exit of the passages 208, the gas is expanded through gas nozzles 209 to a lower pressure, thereby producing high velocity gas jets 216. The reaction force from the jets also produces a torque on the shaft 241. As shown, the gas nozzles 209 are also directed counterclockwise. Nozzles 209 alternate with nozzles 210 for dynamic balance, and torque production balance, about axis 240.

In FIG. 12, gas collection or reception passage zones 215a alternate with liquid reception or collection holes 213 associated with the liquid ring or layer 203; as schematically shown. As explained above, the holes 215 are at a lesser radius relative to holes 213.

Two-phase nozzles 201 are fixedly carried by non-rotary structure 199.

I claim:

1. In a rotary turbine having inlet means for mixtures of gas and liquid, and rotary shaft means, the combination comprising a) separator means to receive the mixture of gas and liquid, and to separate the mixture into a stream of gas and a stream of liquid, b) first means to receive the stream of gas for generating torque exerted on the shaft means, c) said separator means including a rotating surface to receive the stream of liquid to form a liquid layer, and for generating torque exerted on the shaft means, d) there being generally radial outflow passages for the separated liquid stream, and liquid nozzles terminating said outflow passages to pass the liquid stream and to convert the induced pressures of the radial outflow of said liquid to velocity of liquid jets, to convert the reaction forces of said liquid jets to shaft power, e) said liquid nozzles being spaced about an axis defined by said shaft means.

2. The combination of claim 1 including two-phase nozzles positioned to direct said mixture toward said rotating surface.

3. The combination of claim 2 wherein said two-phase nozzles are spaced about said axis defined by said shaft means.

4. The combination of claim 2 wherein said separator means forms at least one lip adjacent said surface to block said liquid layer from flow past the lip, said outflow passages located to receive liquid from said layer centrifugally urged toward said passages.

5. The combination of claim 4 wherein said separator means forms at least one gas escape slot spaced radially inwardly relative to said lip, there being gas nozzles to receive the gas flow relatively outwardly from said escape slot toward said gas nozzles, the gas flow subjected to centrifugal force to increase the gas pressure, the gas then expanding through the gas nozzles to produce gas jets directed to produce torque acting on said shaft means.

6. The combination of claim 5 wherein there are multiples of said liquid nozzles and multiple of said gas nozzles.

7. The combination of claim 6 wherein said gas and liquid nozzles alternate, about the axis defined by said shaft means.

8. The combination of claim 8 wherein all of said nozzles are directed counterclockwise.

* * * * *